(12) United States Patent
Takano

(10) Patent No.: US 6,582,005 B2
(45) Date of Patent: Jun. 24, 2003

(54) INSTRUMENT PANEL FRAME

(75) Inventor: Akira Takano, Tokyo-to (JP)

(73) Assignee: Fuji Jukogyo Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 10/096,842

(22) Filed: Mar. 14, 2002

(65) Prior Publication Data

US 2002/0130529 A1 Sep. 19, 2002

(30) Foreign Application Priority Data

Mar. 15, 2001 (JP) .......................... 2001-74181

(51) Int. Cl.$^7$ .............................................. B62D 25/14
(52) U.S. Cl. .......................... 296/70; 296/72; 296/208; 180/90
(58) Field of Search .......................... 296/70, 72, 208, 296/203.02, 192, 194, 190.09, 188, 189; 180/90; 454/69, 127, 141, 143

(56) References Cited

U.S. PATENT DOCUMENTS

| | | | | |
|---|---|---|---|---|
| 4,646,879 A | * | 3/1987 | Mahler et al. | 296/208 |
| 5,354,114 A | * | 10/1994 | Kelman et al. | 296/192 |
| 5,358,300 A | * | 10/1994 | Gray | 296/192 |
| 5,707,100 A | * | 1/1998 | Suyama et al. | 296/192 |
| 5,762,395 A | * | 6/1998 | Merrifield et al. | 296/203 |
| 5,823,602 A | * | 10/1998 | Kelman et al. | 296/70 |
| 5,857,726 A | * | 1/1999 | Yokoyama et al. | 296/70 |
| 5,934,744 A | * | 8/1999 | Jergens et al. | 296/192 |
| 5,938,266 A | * | 8/1999 | Dauvergne et al. | 296/70 |
| 5,979,965 A | * | 11/1999 | Nishijima et al. | 296/70 |
| 5,997,078 A | * | 12/1999 | Beck et al. | 296/208 |
| 6,227,611 B1 | * | 5/2001 | Dauvergne | 296/208 |

\* cited by examiner

Primary Examiner—D. Glenn Dayoan
Assistant Examiner—G Blankenship
(74) Attorney, Agent, or Firm—Smith, Gambrell & Russell

(57) ABSTRACT

There is provided an instrument panel frame for achieving high strength and light weight and for enabling a complicated shape. The partial frames and divided by a plane in the widthwise direction of the vehicle body are joined to each other, and the duct passage is formed between them.

23 Claims, 2 Drawing Sheets

INSTRUMENT PANEL FRAME

BACKGROUND OF THE INVENTION

1. Technical Field

The present invention relates to an instrument panel frame positioned between a bulkhead for dividing an engine compartment and a vehicle interior, and particularly about the instrument panel installed in a widthwise direction of a vehicle.

2. Related Art

Parts such as an air conditioner, a duct, a knee guard etc. are placed between a bulkhead (hereafter referred to as a dash board) for dividing an engine compartment and a vehicle interior with an instrument panel. These parts are mounted on a steering support beam fixed between a front pillar of a vehicle body using brackets. However, in this case, not only does the process become complicated but also there will be an increased number of parts since fixing parts such as brackets are also needed because it is necessary to assemble these compartments on an assembly line.

Therefore, in recent years, the number of parts such as brackets is reduced and it enables the parts to be partially assembled at a different location to improve assembling efficiency by individually mounting such parts onto frames (instrument panel frames) formed separately and by arranging the frames between the dash board and the instrument panel.

However, since each part is distributed entirely in the widthwise direction and in the up/down direction between the dashboard and the instrument panel, the instrument panel frame will be large and the weight will be increased if they are mounted.

In addition, the instrument panel frame has a space to lighten the weight, and some space is utilized as a containment case for structural parts of such as the air conditioner. However, there is a limit on the shape in order to form it by molding and it is also difficult to secure its strength.

SUMMARY OF THE INVENTION

The present invention has been conceived in view of the above described situation, and an object of the present invention is to provide an instrument panel frame that is both light and strong, and can be formed in a complicated shape.

The instrument panel frame of a first aspect of the invention is interposed between a bulkhead behind an engine compartment and an instrument panel for mounting various instruments in front of a driver and provided to extend in a widthwise direction of a vehicle, comprising: an upper frame of the instrument panel frame with a substantially Z-shaped cross-section viewed from the widthwise direction; a lower frame of the instrument panel frame with the substantially Z-shaped cross-section provided under the upper frame so as to contact upper and lower flange portions respectively for forming a space by a pair of side walls; and a plurality of ribs horizontally extended from a substantially vertical wall of the lower frame and abutted to an upper inclined wall of the upper frame for forming an air duct by a simple and rigid reinforced portion without adding other components therefor.

According to the first aspect of the invention, as the ventilation duct is formed with the instrument panel frame, it is unnecessary to install an additional part, i.e. air duct, and it can save a large amount of works and reduce a number of the parts.

A second aspect of the invention, is the instrument panel frame of the first aspect, wherein the plurality of ribs form a cross-section for reinforcing an entire structure of the instrument panel frame thereby.

According to the second aspect of the invention, obviously almost the same effects can be attained as those in the first aspect, and particularly, a high strength and light weight frame can be made by a plurality of closed sections formed in there.

A third aspect of the invention is the instrument panel frame of the first aspect, wherein the plurality of ribs provide a groove for securely supporting a wire harness.

According to the third aspect of the invention, obviously almost the same effects can be attained as those in the inventions described in the first aspect. And particularly, since the wire harness can be supported by inserting into the groove for supporting the wire harness, and the number of parts can be so largely reduced that a mounting operation of a harness becomes easy, because clips for supporting the harness are not needed.

A fourth aspect of the invention is the instrument panel frame of the first aspect, wherein at least a lower portion of one of the frames is downwardly extended to a floor of the vehicle for easily installing another required components.

According to the fourth aspect of the invention, almost the same effects can be attained as those in the inventions described in the first aspect. And particularly, assembly operations become easy as other parts can be mounted at the extended section of the frame.

PREFERRED MODES OF EMBODYING THE INVENTION

Preferred embodiments of the present invention will be described in the following with reference to the drawings.

Figure 1:
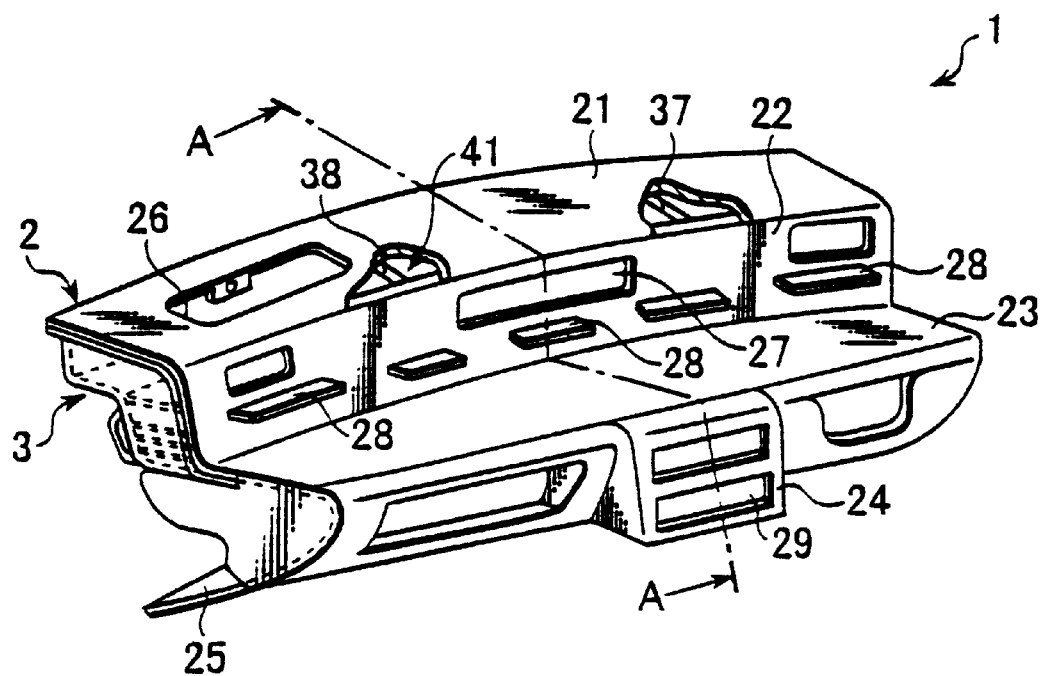
FIG. 1 is a perspective view schematically showing an embodiment of an instrument panel frame of the present invention.
Figure 2:
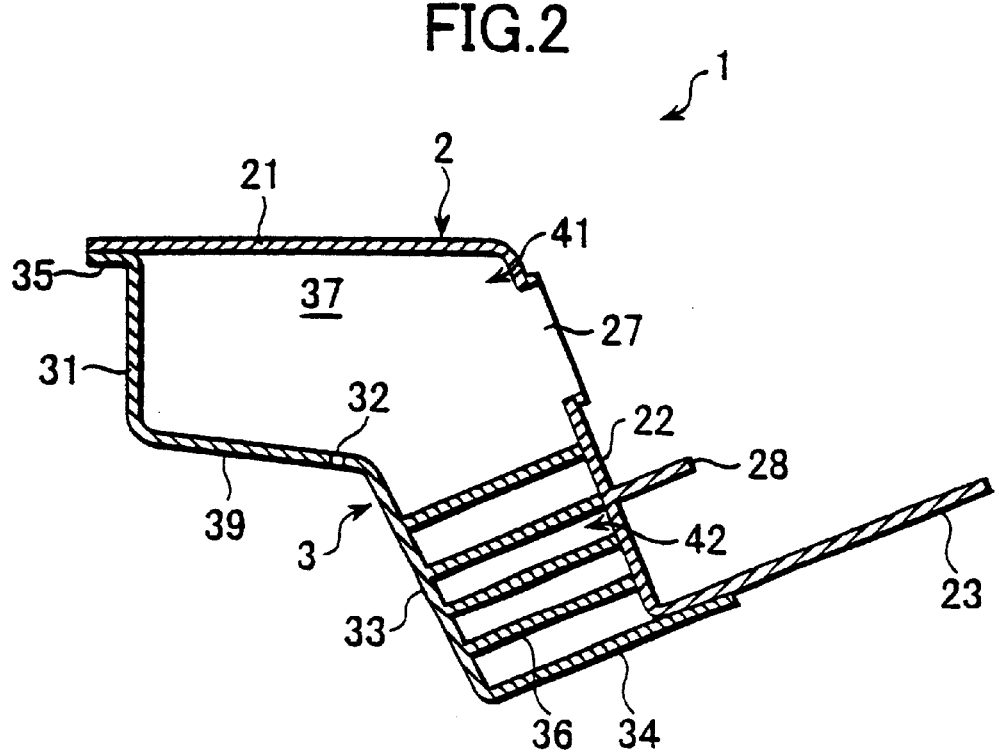
FIG. 2 is a cross section taken along line A—A of the instrument panel frame in FIG. 1, showing the relevant section.
Figure 3:
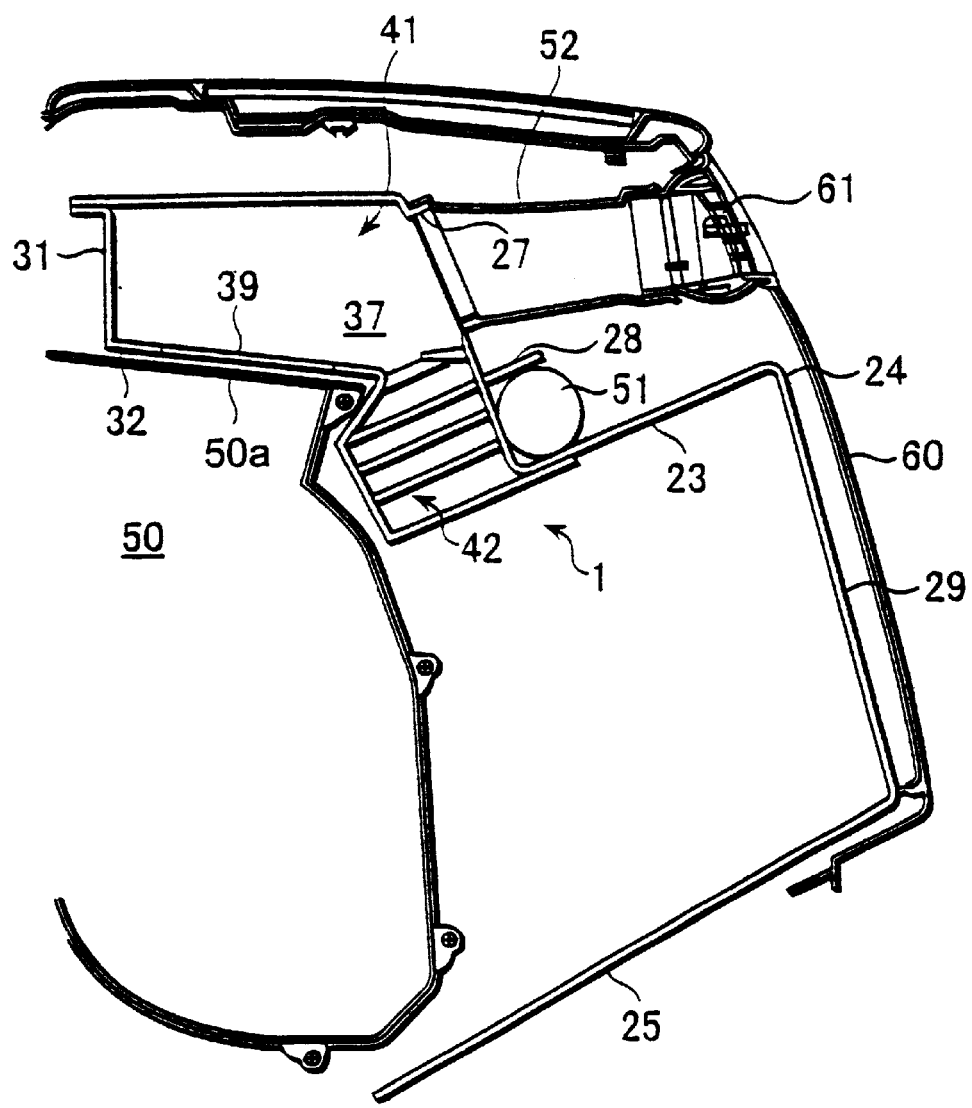
FIG. 3 is a cross-sectional view showing the instrument panel frame in FIG. 1 mounted in the vehicle body.

FIG. 1 is a perspective view schematically showing an instrument panel frame of the present invention, FIG. 2 is a cross section taken along the line A—A of FIG. 1 schematically showing the relevant section, and FIG. 3 is a cross-sectional view showing the state where the instrument panel frame is mounted on the vehicle body.

The instrument panel frame 1 comprises two partial frames, namely, an upper frame 2 and a lower frame 3.

The upper frame 2 is formed by an upper stepped surface wall 21 extending in a substantially horizontal direction towards a vehicle interior, an upper inclined surface wall 22 extending in a downwardly inclined direction from the upper stepped surface wall 21 to the vehicle interior, a lower stepped surface wall 23 extending in a slightly upward direction from the upper inclined surface wall 22 to the vehicle interior, an instrument panel mounting surface wall 24 extending in a downward direction from the lower stepped surface wall 23, and a lower inclined surface wall 25 extending in a downwardly inclined direction, towards the floor 70 from the instrument panel mounting surface wall 24 to the engine compartment.

Then, the upper stepped surface wall 21 of the upper frame 2, as shown in FIG. 1, is formed with an airbag placing hole 26. The upper inclined surface wall 22 is formed with a vent hole 27, and furthermore, ribs (second ribs) 28 are provided in a upright manner at a position close to the lower stepped surface wall 23 in the width direction at appropriate intervals. In addition, the instrument panel mounting surface wall 24 is formed with a hole 29 for placing of audio devices, etc.

The lower frame 3 is formed by a vertical surface wall 31 extending downward, an upper stepped surface wall 32 extending in a substantially perpendicular direction from the vertical surface wall 31 to the vehicle interior and mounted substantially horizontally, an inclined surface wall 33 extending in a downwardly inclined direction from the upper stepped surface wall 32 to the vehicle interior, and a lower stepped surface wall 34 extending in the slightly upward direction from the inclined surface wall 33 to the vehicle interior. Furthermore, the top end of the vertical surface wall 31 of the lower frame 3 is formed with a flange 35 extending in a substantially horizontal direction.

The inclined surface wall 33 of the lower frame 3 is provided with a plurality of (4 in the drawing) ribs 36 (first ribs) in a upright manner, and side walls 37 and 38 are provided in a upright manner from the vertical surface wall 31 and the upper stepped surface wall 32 (see FIG. 1), in addition, the upper stepped surface wall 32 is formed with a vent hole 39.

The upper frame 2 and the lower frame 3 are formed by molding with synthetic resin. Therefore, in this embodiment, the ribs 28 of the upper frame 2 are formed in parallel with the lower stepped surface wall 23, and the vent hole 27 is formed in the upper inclined surface wall 22. Additionally, ribs 36 of the lower frame 3 are formed in parallel with the lower stepped surface wall 34, and the side walls 37 and 38 are provided perpendicular to the vertical surface wall 31 and the upper stepped surface wall 32 in a upright manner. In other words, the structure of a mold is simplified by making the direction of the ribs 28 and 36 and the side walls 37 and 38 match with the extraction direction of separating the parts from the mold.

The upper and lower frames 2 and 3 formed in this manner, as shown in FIG. 2, are stacked up and integrally formed with each other by vibration welding, etc. Namely, the end of the upper stepped surface wall 21 and the flange 35 overlap each other. The upper inclined surface wall 22 side and the top end of the lower stepped surface wall 34 overlap each other. The top ends of the ribs 36 are also abutted against the upper inclined surface wall 22. And, the free ends of the side walls 37 and 38 are abutted against the upper stepped surface wall 21 and the upper inclined surface wall 22, all of which are fixed together in this manner by vibration welding, etc.

In this way, the duct passage 41 is defined by the integrated upper frame 2 and lower frame 3 and a reinforcement section 42 is formed at their meeting sections. In other words, the upper stepped surface wall 21 and the upper inclined surface wall 22, the vertical surface wall 31, the upper stepped surface wall 32, a part of the inclined surface wall 33 and the top positioned rib 36, and the side walls 37 and 38 define duct passage way 41. And in addition, a plurality of closed sections (4 sections in the drawing) are formed by the inclined surface wall 33, the ribs 36, and the upper inc/lined surface wall 22.

As a result, the instrument panel frame 1 that the upper frame 2 and the lower frame 3 integrally form is structured with necessary parts such as knee protectors. Then, both ends of the instrument panel frame 1 are fixed to the vehicle body side of front pillars etc. with the instrument panel frame 1 in a state where the vent hole 39 formed in the upper stepped surface wall 32 is aligned with a vent hole 502 of a heater unit 50. And the middle section is fixed to a dash panel, etc. respectively using screws to mount to the vehicle body. Then, a wire harness 51 is inserted into a groove for supporting a wire harness defined by the ribs 28, the upper inclined surface wall 22 in the instrument panel frame 1, and the lower stepped surface wall 23. Also a steering column is mounted at the reinforcement section 42. In addition, the vent hole 27 and a vent hole 61 of an instrument panel 60 are connected to each other through a duct 52, and the instrument panel 60 is mounted so as to cover the instrument panel frame 1.

Incidentally, although the instrument panel frame 1 comprises two partial frames of the upper frame 2 and the lower frame 3 in the above described embodiment, the instrument panel frame 1 may comprise three or more partial frames.

Also, although the groove for supporting the wire harness is formed on one partial frame, this may be formed between two partial frames. Similarly, the ribs 36 with the reinforcement section 42 may be formed at each of the two partial frames, and the reinforcement section 42 may be formed by having these ribs joined to each other.

In the instrument panel frame of the present invention, since the instrument panel frame is formed with a ventilation duct, it is not necessary to specially provide an air duct and also it is not necessary to mount the air duct, and as a result, achieved are a saving in the amount of work and reduction in the number of the parts.

Also, in the instrument panel frame of the present invention, since a plurality of closed sections are formed inside, the high strength and light weight frame can be obtained.

In addition, in the instrument panel frame of the present invention, since the wire harness can be supported by inserting into the groove defined by the ribs, an operation of mounting the wire harness is made easier, and the number of parts can be reduced by using clips, etc. for supporting the wire harness are not needed.

Furthermore, in the instrument panel frame of the present invention, since other parts can be mounted at the extended section of the frame and the parts can be partially assembled at a different location in advance, and the operation for assembling the parts, etc becomes easy.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. An instrument panel frame interposed between a bulkhead behind an engine compartment and an instrument panel for mounting various instruments in front of a driver and provided to extend in a widthwise direction of a vehicle, comprising:
   an upper frame of said instrument panel frame with a substantially Z-shaped cross-section viewed from said widthwise direction;
   a lower frame of said instrument panel frame with said substantially Z-shaped cross-section provided under said upper frame so as to contact upper and lower flange portions respectively for forming a space by a pair of walls;

a plurality of first ribs horizontally extended from a substantially vertical wall of said lower frame and abutted to an upper inclined wall of said upper frame for forming an air duct by a simple and rigid reinforced portion without adding other components therefor; and a plurality of second ribs extended from said walls.

2. The instrument panel frame according to claim 1, wherein: said plurality of first ribs form a cross-section for reinforcing an entire structure of said instrument panel frame thereby.

3. The instrument panel frame according to claim 1, wherein: said plurality of second ribs provide at least one groove for securely supporting a wire harness.

4. The instrument panel frame according to claim 1, wherein: at least a lower portion of one of said frames is downwardly extended to a floor of said vehicle for easily installing other required components.

5. An instrument panel frame interposed between a bulkhead behind an engine compartment and an instrument panel for mounting various instruments in front of a driver and provided to extend in a widthwise direction of a vehicle, comprising:

an upper frame of said instrument panel frame with a substantially Z-shaped cross-section viewed from said widthwise direction;

a lower frame of said instrument panel frame with said substantially Z-shaped cross-section provided under said upper frame so as to contact upper and lower flange portions respectively for forming a space by a pair of walls; and a plurality of outer ribs extended from an outer side of said walls.

6. The instrument panel frame according to claim 5, wherein said plurality of outer ribs provide at least one groove for securely supporting a wire harness.

7. The instrument panel frame according to claim 5, wherein at least a lower portion of one of said frames is downwardly extended to a floor of said vehicle for installing components.

8. An instrument panel frame positionable between an engine bulkhead and an instrument panel, comprising:

an upper frame having an upper stepped surface wall with a first end and a second end, an intermediate surface wall extending down away from the second end of said upper stepped surface wall and having a first side to which said upper stepped surface wall is positioned and a second side, and a lower stepped surface wall extending off from said intermediate surface wall and positioned on the second side of the intermediate surface wall to form a Z-shaped cross-section in said upper frame;

a lower frame having a first surface wall which has a first end joined with the first end of the upper stepped surface wall of said upper frame and which first surface wall extends vertically down away from said upper frame, said lower frame further including an upper stepped section wall, a lower stepped section wall and an intermediate section wall, said intermediate section wall extending between a lower end of said upper stepped section wall and a first end region of said lower stepped section wall, and said lower stepped section wall having a second end region to which is joined the lower stepped surface wall of said upper frame, with said upper and lower frames being spaced apart to define an internal space;

a pair of side walls which are spaced apart in a direction of elongation of said upper and lower frames and positioned within said internal space so as to define a duct passage in said instrument panel frame;

a plurality of reinforcement ribs joined to said intermediate section wall and said intermediate surface wall and extending between said intermediate section wall and said intermediate surface wall.

9. The instrument panel frame of claim 8 wherein said reinforcement ribs extending between said intermediate section wall and said intermediate surface wall are in a parallel relationship.

10. The instrument panel frame of claim 9 wherein the lower stepped surface wall of said upper frame extends parallel with said reinforcement ribs.

11. The instrument panel frame of claim 10 wherein the lower stepped section wall of said lower frame extends parallel with said reinforcement ribs.

12. The instrument panel frame of claim 9 wherein the lower stepped section wall of said lower frame extends parallel with said reinforcement ribs.

13. The instrument panel frame as recited in claim 8 wherein a secondary rib is provided on the second side of the intermediate surface wall of said upper frame so as to define a wire harness reception groove in said upper frame.

14. The instrument panel frame as recited in claim 13 wherein the reception groove is a U-shaped open groove defined by said secondary rib, a portion of said intermediate surface wall, and said lower support surface wall.

15. The instrument panel frame as recited in claim 13 wherein said secondary rib extends parallel with said lower support surface wall.

16. The instrument panel frame as recited in claim 15 wherein said secondary rib extends parallel with said ribs extending between said intermediate surface wall and said intermediate section wall.

17. The instrument panel frame as recited in claim 9 wherein there is included four reinforcement ribs.

18. The instrument panel frame as recited in claim 9 wherein said reinforcement ribs are in an integral molded relationship with said upper stepped section wall, intermediate inclined section wall, and lower stepped section wall.

19. The instrument panel frame as recited in claim 8 wherein said intermediate section wall and intermediate surface wall are parallel.

20. The instrument panel fame as recited in claim 19 wherein said intermediate surface wall extends obliquely down and away from said upper stepped surface wall.

21. The instrument panel frame as recited in claim 8 wherein a vent hole is formed in said intermediate inclined surface wall at a position above an upper one of said reinforcement ribs.

22. The instrument panel frame as recited in claim 8 wherein the lower stepped surface wall of said upper frame slopes upwardly from said intermediate surface wall.

23. The instrument panel frame as recited in claim 8 wherein said upper frame further comprises an engine compartment covering section extending obliquely down off an end of said lower stepped surface wall.

* * * * *